United States Patent [19]
Peter et al.

[11] 3,972,635
[45] Aug. 3, 1976

[54] DOUBLE CONICAL HUB-TO-SHAFT CONNECTION

[75] Inventors: Oskar Erich Peter, Brackenheim; Lothar Peter, Guglingen, both of Germany

[73] Assignee: Oskar Erich Peter, Brackenheim, Germany

[22] Filed: July 3, 1975

[21] Appl. No.: 592,923

[30] Foreign Application Priority Data
Apr. 3, 1975  Germany.......................... 2514510

[52] U.S. Cl................................ 403/13; 403/370
[51] Int. Cl.² ........................................ F16D 1/06
[58] Field of Search .......... 403/370, 371, 369, 368, 403/16, 13

[56] References Cited
UNITED STATES PATENTS

| | | | |
|---|---|---|---|
| 2,407,032 | 9/1946 | Myers | 403/370 X |
| 3,180,164 | 4/1965 | Chung | 403/371 X |
| 3,656,785 | 4/1972 | Lothar | 403/371 X |
| 3,679,247 | 7/1972 | Peter | 403/366 |
| 3,717,367 | 2/1973 | Peter et al. | 403/370 X |
| 3,776,651 | 12/1973 | Peter | 403/370 X |
| 3,847,493 | 11/1974 | Peter | 403/371 X |
| 3,847,495 | 11/1974 | Peter | 403/370 |

*Primary Examiner*—Andrew V. Kundrat
*Attorney, Agent, or Firm*—Flynn and Frishauf

[57] ABSTRACT

To simplify manufacture of double conical hub-to-shaft connections and to improve centricity, a double conical centering ring is located intermediate the connection, formed with a cylindrical groove, so dimensioned that it will entirely receive a radially resilient ring, which ring can snap into a matching ring groove formed on a double conical surface, to entirely fill the groove and accept compressive forces without deformation of the conical surfaces adjacent the groove.

5 Claims, 1 Drawing Figure

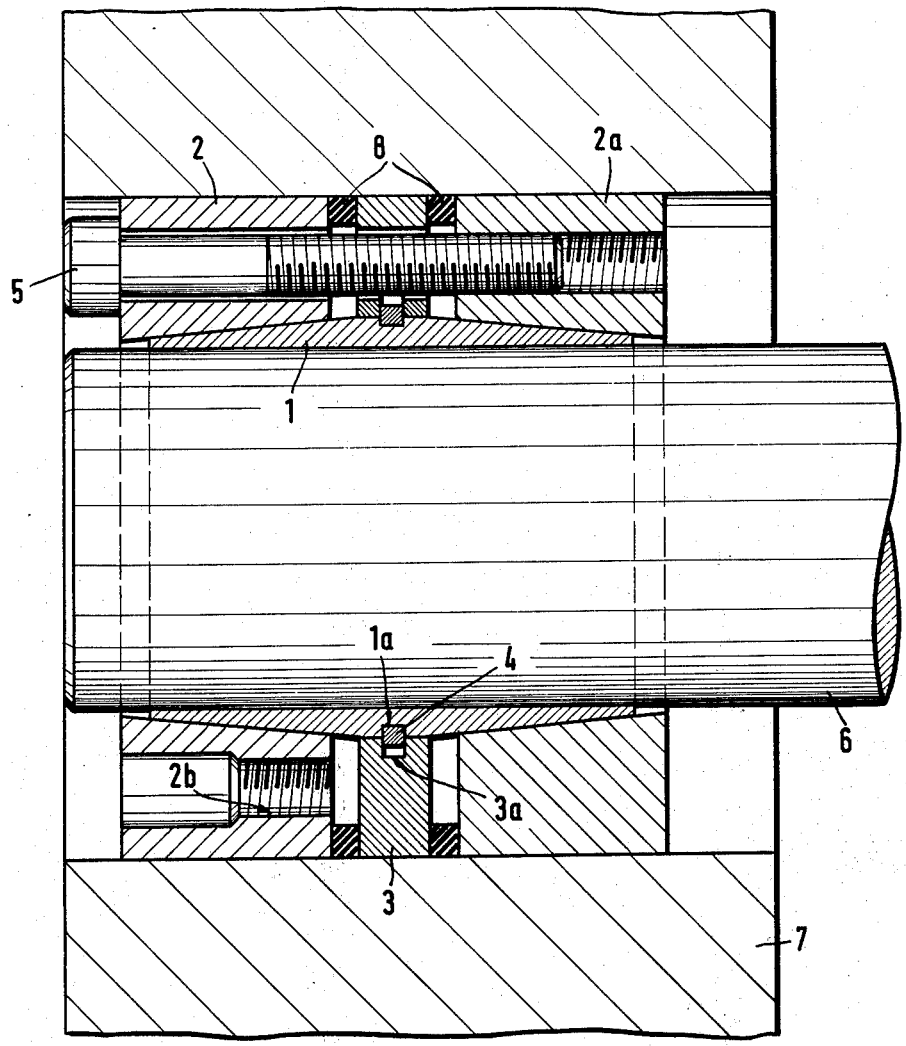

DOUBLE CONICAL HUB-TO-SHAFT CONNECTION

Cross reference to related patents: 3,656,785; 3,717,367; 3,679,247; 3,776,651; 3,847,493; 3,847,495; assigned to the assignee or inventor, respectively, of the present application.

The present invention relates to a double conical hub-to-shaft connection to secure a hub to a shaft for transmission of torque, and more particularly to such a structure in which double conical inner and outer rings are clamped together by means of clamping bolts located in planetary configuration around the shaft.

Double conical hub-to-shaft connections have previously been proposed, see, for example, German Disclosure Document DT-OS 2,329,940. In order to precisely center the hub on the shaft, a radially outwardly directed centering ring is located on the inner double conical clamping ring of the connection there disclosed, to accept the weight of the hub, without additional radial stresses, and to provide for accurate centering. In the structure disclosed, the double conical inner ring is integral with the radially projecting centering ring. This makes it difficult to obtain radially uniform stressing of the double conical inner ring, and the number of clamping screws which extend through the centering ring must be made quite substantial to permit transfer of substantial torques. Manufacturing a ring-shaped element with two conical surfaces and a centering ring as an integral element is comparatively expensive, since very time-consuming; additionally, a substantial quantity of material must be removed from a raw casting which is expensive and results in much material waste, which is economically and socio-economically undesirable.

Various other structures have been proposed in order to decrease the requirement for a multiplicity of clamping screws, all of which must be tightened, and tightened accurately, during clamping, in order to decrease assembly and disassembly time. One such structure provides for clamping sets having two outer clamping rings engaging, or cooperating with a double conical inner clamping ring having a longitudinal slit formed therein. The slit edges, that is, the axial slits formed in the rings, tend to damage the shaft and may cause localized stresses; they decrease the strength of the shaft to which the connection is attached and impair its operating life and safety. Axially slit clamping rings are undesirable from a general structural point of view, both regarding clamping as well as their resiliency, and uniformity of radial force transfer around the entire circumference of the shaft is impaired. The radial slit also permits entry of contaminant substances, dirt, oil, shavings, moisture, and the like, which may contribute further to deterioration of the clamping connection, or of the hub, or shaft, respectively, which are to be connected together.

It has also been proposed (see German Pat. No. 2,142,453) to utilize a closed continuous inner clamping ring in combination with a continuous closed outer clamping ring having oppositely located conical surfaces, and being formed with cylindrical collars at the ends; these collars do not, however, serve to center the hub to the shaft.

A closed inner clamping ring having cylindrical centering collars at the end is disclosed in U.S. Pat. No. 3,849,015; the centering collars are larger than the outer diameter of the slit outer clamping rings in order to accept the weight of the hub, and attached wheels or sheaves which may be of substantial size, such as large gears, inertia disks, flywheels, or the like. The substantial weights of these elements are accepted by the centering rings or disks, or collars and, though adequate in carrying out their function, require considerable manufacturing effort, material removal, and manufacturing time.

It is an object of the present invention to provide a double conical hub-to-shaft connection which is simple to manufacture, has excellent torque transfer characteristics, while providing for direct transfer of weight from the hub to the shaft without interposition of conical surfaces, that is, directly radially, and which can be readily manufactured.

SUBJECT MATTER OF THE PRESENT INVENTION

Briefly, a double conical inner ring is formed with a circumferential groove in the region where the conical surfaces merge. The inner ring may, at this region, be flattened so that the two conical surfaces each terminate in a cylindrical portion in which the groove actually is formed. A centering ring is located in that region, between the outer conical rings. The centering ring has an outer diameter which bears against the inner surface of the hub. The centering ring is formed with a circumferential ring groove which matches the groove in the inner double conical ring. A resilient spring is located in the ring groove, the ring groove being of such depth to wholly accept the resilient spring ring, so that the bearing ring can be slipped over the conical surfaces, the spring ring then snapping into the groove of the bearing ring. Preferably, the groove in the double conical ring and the spring ring are matched to size, so that axial forces applied against the double conical inner ring are accepted by the spring ring, to prevent deformation of the double conical ring.

The centering ring can now be made as a separate element, easily and inexpensively, and to great accuracy on automatic machinery. It is in axially fixed position with respect to the inner double conical ring which, likewise, can be made as a solid continuous circumferential element of comparatively thin wall thickness. The centering ring is held in position by means of a radially resilient coupling ring, such as a C-ring. Manufacture of the entire assembly is greatly simplified, with little waste of material during manufacture, and hence short machining time. Manufacturing the double conical inner clamping ring and the centering ring as separate elements permits uniform tightening of the conical surfaces against each other with respect to radial force transfer with only a comparatively small number of clamping bolts, while avoiding stress concentrations, "notch effects" and open spaces through which contamination may enter, so that the operative connection of thick-walled outer rings, closed at both ends, with the inner rings can be easily made, while being capable of transferring substantial torques.

The thick-walled outer rings may well be identical; they are preferably made of a material having high yield strength. Upon clamping the tightening bolts, when using such material, the tension forces are effectively accepted by the outer clamping rings so that the radial extent of the hub-to-shaft connection can be held to a minimum, thus decreasing material and weight of the connection.

The invention will be described by way of example with reference to the accompanying drawing, wherein the single FIGURE is a schematic axial cross-sectional view through a hub-to-shaft connection, in unstressed state, and illustrating the concept of the present invention.

The double conical hub-to-shaft connection uses an inner double conical clamping ring 1 having a square groove 1a formed at the ridge portion thereof. Two outer conical rings 2, 2a which, in their appearance, may be the mirror image of each other, are fitted over the conical surfaces of the inner double conical ring 1. At the center of the inner conical ring 1, a centering ring 3 is located. Centering ring 3 is formed with a circumferential groove 3a in which a radially resilient coupling ring 4 is snapped. The depth of the groove 3a formed in the centering ring 3 is such that it can wholly receive the spring ring 4, so that, with the spring ring 4 inserted, ring 3 can be slid over the inner ring 1, ring 4 snapping into the groove 1a when the ring 3 is properly seated. In this position, centering ring 3 is locked axially with respect to the inner ring 1. Axially extending clamping bolts 5 couple the outer conical rings 2, 2a together, and upon tightening move the rings against the conical surfaces to provide radial pressure between the hub 7 and the shaft 6. The bolts 5 are located in planetary arrangement around the shaft 6. The ring 2 is further formed with tapped bores 2b which do not have matching counterparts in the ring 2a. Corresponding bores may be formed in the ring 3 (not shown), and of sufficient clearance to permit passage of the tapped bolts 5 therethrough, similar to the bore shown in connection with the illustrated bolt 5. By screwing bolts 5 into the tapped holes 2b, the rings 2, 2a are separated by axial pressure of the bolts screwed into ring 2 against the end face of the ring 2a. Sealing rings 8, made of rubber, plastic material or the like, are preferably located at both sides of the centering ring 3 to prevent ingress of contamination and to seal the entire assembly.

ASSEMBLY, USE AND OPERATION

Upon tightening of the bolts 5, located in planetary arrangement around shaft 6, the two thick-walled outer rings 2, 2a with their conical inner surfaces are moved towards each other and against the conical outer surfaces of the double conical ring 1. In dependence on the tightening force applied to bolts 5, extending in axial direction, radial forces will result which radially press against shaft 6 and hub 7 to provide for substantial force engagement, permitting transfer of substantial torques, and connection of the hub 7 to the shaft 6 without play, and with exact centering.

To disconnect the hub-to-shaft connection without using any wheel pulling tool or the like, some of the bolts 5 are screwed into bores 2b of the outer ring 2 until they engage either the centering ring 3 or the end face of ring 2a, when passing through an open bore formed in ring 3. To loosen the ring 2a, the ring 3 is additionally formed with axially extending tapped bores, similar to bore 2b, into which the bolts 5 can be screwed, to again bear against the end face of the ring 2a.

Various changes and modifications may be made, particularly with respect to loosening of the connection. The width of the groove 1a is preferably so arranged that the ring 4 snaps into it to fill the groove essentially throughout its depth and width, and the ring 4, circumferentially, is preferably so made that it is essentially closed when snapped into the groove 1a. The position of the continuous double conical ring 1 and the two single conical rings 2, 2a can be reversed in that the outer ring can be constructed to be of substantially thin-walled material having double conical inner surfaces in which the centering ring is held by means of a radially (outwardly radial) coupling ring, and having an inner surface bearing on the shaft 6. Adjacent the coupling ring — spaced, for example, by deformable plastic or rubber rings similar to rings 8, are two thick-walled continuous inner clamping rings having corresponding conical surfaces at their outer sides to match the inwardly directed conical surfaces of the outer ring. This embodiment is not shown, since it is exactly the reverse of that illustrated, and the construction thereof will be obvious; it operates in all respects similarly to that of the described embodiment. The embodiment described has the advantage that the bolts are located further from the center than in the modified arrangement, and thus permit somewhat greater circumferential spacing between each other. The location and arrangement of double conical continuous rings is illustrated and described in co-pending application U.S. Ser. No. 588,585, filed June 19, 1975, entitled "Double Conical Hub-to-Shaft Connection", claiming priority of German Application P 24 51 311.9 of Oct. 29, 1974, the description of which is incorporated herein by reference.

We claim:
1. Double conical hub-to-shaft connection to connect a shaft element (6) to a hub element (7) comprising
an inner ring (1) having inner cylindrical surfaces seating on the shaft (6) and outer double conical surfaces;
two outer rings (2, 2a) having outer cylindrical surfaces seating in the hub (7) and inner conical surfaces seating on the respective outer conical surfaces of the inner ring (1),
and the outer rings being formed with axial bores to receive clamping bolts (5) tending to tighten the outer rings axially towards each other and thus move the conical surfaces over each other, the outer rings having greater cross-sectional area than the inner ring to accept said bores and clamping bolts;
characterized in that
the double conical ring is formed with a circumferential groove (1a) at the zone intermediate its length;
a centering ring (3) is provided located between the outer ring (2, 2a) and having an outer cylindrical surface bearing against the hub (7), the centering ring being formed with a circumferential ring groove (3a) matching the groove (1a) in the double conical ring;
and a radially resilient spring ring (4) is provided, located in the ring groove (1a) of the double conical ring and resiliently retained therein, the depth of the ring groove (3a) in the centering ring corresponding to the radial thickness of said spring ring (4) to permit receiving the spring ring (4) entirely within said groove upon assembly of said centering ring (3) over the conical surfaces.

2. Connection according to claim 1, wherein the cross-sectional configuration and area of the groove (1a) in the double conical ring (1) and between said double conical surfaces and the cross-sectional configuration and area of said spring ring (4) are similar so that the spring ring will be received in the groove (1a) and essentially completely fill said groove between said double conical surfaces and prevent deformation of said surfaces with respect to each other upon tightening of said outer rings over the double conical surfaces.

3. Connection according to claim 1, wherein the double conical surfaces terminate in the central region at spaced positions, and are connected by an essentially cylindrical surface, said centering ring (3) fitting over said essentially cylindrical surface, so that the weight of the hub is transferred on the shaft over essentially cylindrical surfaces between the hub, the ring, the essentially cylindrical center surface of the double conical ring, and the shaft (6).

4. Connection according to claim 1, wherein the outer conical rings (2, 2a) have a shape and configuration which are essentially the mirror image of each other.

5. Connection according to claim 4, wherein the outer conical rings (2, 2a) are made of a material having a high yield strength and a remote yield point.

* * * * *